United States Patent
Wells, Sr.

(10) Patent No.: US 9,441,760 B2
(45) Date of Patent: Sep. 13, 2016

(54) PLATFORM UMBILICAL CART

(71) Applicant: Fabrication of Rig and Exploration Equipment, Inc., Cleveland, TX (US)

(72) Inventor: David A. Wells, Sr., Cleveland, TX (US)

(73) Assignee: Fabrication of Rig and Exploration Equipment, Inc., Cleveland, TX (US)

(*) Notice: Subject to any disclaimer, the term of this patent is extended or adjusted under 35 U.S.C. 154(b) by 302 days.

(21) Appl. No.: 14/275,849

(22) Filed: May 12, 2014

(65) Prior Publication Data

US 2015/0322733 A1 Nov. 12, 2015

Related U.S. Application Data (63) Continuation-in-part of application No. 13/631,159, filed on Sep. 28, 2012, now Pat. No. 8,820,499.

(51) Int. Cl.

| | |
|---|---|
| *F16L 3/01* | (2006.01) |
| *B66C 13/12* | (2006.01) |
| *E21B 19/08* | (2006.01) |
| *H02G 11/00* | (2006.01) |

(52) U.S. Cl.
CPC .............. *F16L 3/01* (2013.01); *B66C 13/12* (2013.01); *E21B 19/08* (2013.01); *H02G 11/003* (2013.01); *H02G 11/006* (2013.01)

(58) Field of Classification Search
CPC ....... B66C 13/04; B66C 13/10; B66C 13/12; B66C 17/00; B66C 19/00; B66C 19/007; B66C 23/00; B66C 25/00; H02G 11/00; H02G 11/003; H02G 11/006; H02G 11/02; B65H 2701/34; F16L 3/01; E21B 19/00; E21B 19/08
USPC ...................................................... 191/12 R
See application file for complete search history.

(56) References Cited

U.S. PATENT DOCUMENTS

| | | | | |
|---|---|---|---|---|
| 1,487,884 A | * | 3/1924 | Poirier | A41H 43/005 104/235 |
| 1,742,012 A | * | 12/1929 | Sloane | H02G 11/02 191/12 R |
| 3,494,485 A | * | 2/1970 | Hasegawa | B63B 27/22 414/142.2 |
| 3,546,400 A | * | 12/1970 | Dechantsreiter | B66C 13/12 137/355.17 |
| 3,833,774 A | * | 9/1974 | Mills | B66C 13/12 137/355.16 |

(Continued)

FOREIGN PATENT DOCUMENTS

JP 03169216 A * 7/1991

*Primary Examiner* — Zachary Kuhfuss
(74) *Attorney, Agent, or Firm* — Robert C. Rolnik (57) ABSTRACT

A cart has a base; and at least two right-side protrusions, namely, a right-side sub-rail protrusion extending horizontally from the base; and a right-side super-rail protrusion extending horizontally from the base. The right-side sub-rail protrusion and right-side super-rail protrusion are adapted to straddle a substantially horizontal flange of a first rail and the first rail is one among the at least one rail. Further, the base has at least two left-side protrusions, namely, a left-side sub-rail protrusion extending in a direction opposite to the right-side sub-rail protrusion from the base; and a left-side super-rail protrusion extending in a direction opposite to the right-side super-rail protrusion from the base. Further, the left-side sub-rail protrusion and left-side super-rail protrusion are adapted to straddle a substantially horizontal flange of a second rail, and the second rail is one among the at least one rail. A vertical support extends upwards from the base.

11 Claims, 7 Drawing Sheets

(56) References Cited

U.S. PATENT DOCUMENTS

| | | | |
|---|---|---|---|
| 4,078,769 A * | 3/1978 | Wamfler | H02G 11/003 191/12 R |
| 4,093,047 A * | 6/1978 | Wampfler | H02G 11/003 174/69 |
| 4,102,550 A | 7/1978 | Campbell et al. | |
| 4,173,373 A | 11/1979 | Campbell et al. | |
| 4,372,510 A | 2/1983 | Skypala | |
| 5,524,548 A * | 6/1996 | Fox | B61H 7/00 104/249 |
| 6,457,418 B1 | 10/2002 | Persson | |
| 7,677,372 B2 | 3/2010 | Maier | |
| 7,739,959 B2 | 6/2010 | Hutchinson | |
| 7,814,839 B2 | 10/2010 | Owens et al. | |
| 8,820,499 B2 * | 9/2014 | Wells, Sr. | H02G 1/06 104/89 |
| 8,869,961 B2 * | 10/2014 | Wells, Sr. | H02G 1/06 104/89 |
| 2008/0066640 A1 | 3/2008 | Hutchinson | |
| 2008/0308281 A1 | 12/2008 | Boutwell, Jr. et al. | |
| 2009/0026032 A1 | 1/2009 | Maier | |
| 2009/0127048 A1 * | 5/2009 | Ichimura | B60L 5/005 191/33 R |
| 2009/0200432 A1 | 8/2009 | Inoue et al. | |
| 2012/0031721 A1 | 2/2012 | Glueckhardt et al. | |
| 2012/0043291 A1 * | 2/2012 | Ichimura | B66C 13/12 212/312 |
| 2013/0233964 A1 | 9/2013 | Woodworth et al. | |
| 2014/0090576 A1 * | 4/2014 | Wells, Sr. | H02G 1/06 105/238.1 |
| 2014/0110538 A1 * | 4/2014 | Wells, Sr. | H02G 1/06 248/55 |

* cited by examiner

PLATFORM UMBILICAL CART

The present application takes benefit of earlier-filed non-provisional application Ser. No. 13/631,159 filed Sep. 28, 2012, entitled, "Umbilical Cart And System".

BACKGROUND

The present invention relates to cable and other filament management and more specifically to supporting conduits extending from a fixed utility connection.

Deployment of modern drilling rigs accomplish great utility from a very limited operating footprints by drilling multiple boreholes within a tract of the surface estate. Subsequent drilling can be diagonal or lateral in order to reach hydrocarbon bearing formations that are scattered from the main drilling site. Nevertheless, at the conclusion of making a borehole, the drilling rig must be moved laterally to initiate another borehole. This movement permits the vibrations and drilling tools to penetrate the top layers of earth without impacting operations at a previously made borehole.

Moving a drilling rig can be labor intensive and create a period where a drill bit makes no downward progress toward the target formation. During this time, the drill bit is idle and site technicians that move the drill string through the borehole are also idled. This gap in apparent productivity is caused by the need to disconnect utilities and effluent pipes while a rig is moved. Further delays occur due to moving of conduits including fluid carrying conduits into position to where the rig is being moved. Moreover, at such new positions, these conduits need to be reconnected in a safe manner.

Further difficulties can occur when the conduits create new ground-level obstacles to moving people and equipment to the rig, as can occur if electrical cables are left on the ground. Such a location for conduits generally increases risks of trips and other injuries, as well as potential to accidentally sever such cables.

Accordingly, some remedy to the above-described deficiencies is desired.

SUMMARY

According to one embodiment of the present invention discloses conduit cart for supporting at least one conduit above at least one rail. The conduit cart has a base; and at least two right-side protrusions, namely, a right-side sub-rail protrusion extending horizontally from the base; and a right-side super-rail protrusion extending horizontally from the base. The right-side sub-rail protrusion and right-side super-rail protrusion are adapted to straddle a substantially horizontal flange of a first rail and the first rail is one among the at least one rail. Further, the base has at least two left-side protrusions, namely, a left-side sub-rail protrusion extending in a direction opposite to the right-side sub-rail protrusion from the base; and a left-side super-rail protrusion extending in a direction opposite to the right-side super-rail protrusion from the base. Further, the left-side sub-rail protrusion and left-side super-rail protrusion are adapted to straddle a substantially horizontal flange of a second rail, and the second rail is one among the at least one rail. A vertical support extends upwards from the base.

BRIEF DESCRIPTION OF THE SEVERAL VIEWS OF THE DRAWINGS

FIG. 5 B is an elevation view, looking longitudinally at the platform cart in accordance with an embodiment of the invention;

FIG. 5 C is a top view of a platform cart, showing the gantry swiveled at an angle to the longitudinal path of the tracks in accordance with an embodiment of the invention;

DETAILED DESCRIPTION

Described herein are at least three cart configurations used to collapse conduit for transport, or for maintaining an orderly work environment at a drilling rig site, among other things. Generally, a drilling rig requires substantial utility lines to provide power, compressed air, and communications cabling between the rig, itself, and a point on the property where such utilities are presented from the various utility companies and/or supply machinery. As a general category, these lines are called conduit, though elsewhere in this specification, the lines can be called filaments, or cables. The combination of a typical set of conduit routed to a drilling rig can weigh approximately 50 pounds per linear foot. Accordingly, some embodiments, particularly when cooperating together, can provide a means to drape such conduit to compress a lateral distance of the net length of conduit by forcing the conduit into a roughly 'M' shaped pattern, or other sinusoidal or convoluted arrangement by draping the cable, as depicted, for example, in the carts 221, 231 and 241 of FIG. 2, also called festoon carts, below.

A still further embodiment may cooperate with one or more festoon carts to provide a way to stow cable along a top of a platform or elongated carriage, so that the length of conduit, in a stowed position, loops back towards the utility source. As such, some slack is provided in the conduit so that it can be expanded to be directed, instead, towards the drilling rig, allowing that portion stowed in the lateral direction, to droop off an edge of a platform cart, and slide underneath the platform cart. as depicted, for example, at FIG. 5A. Further utility to the elongated carriage may be offered in that the elongated carriage may elevate a trough or platform to provide a passage thereunder to allow plural festoon carts to be slid into a tight configuration such that that those festoon carts, as packed, are underneath the platform. Still further, the festoon carts may be slid out a rear side of the platform cart proximal to a utility bulkhead, and remote from a drilling rig, the from underneath the platform.

Figures 1, 2:
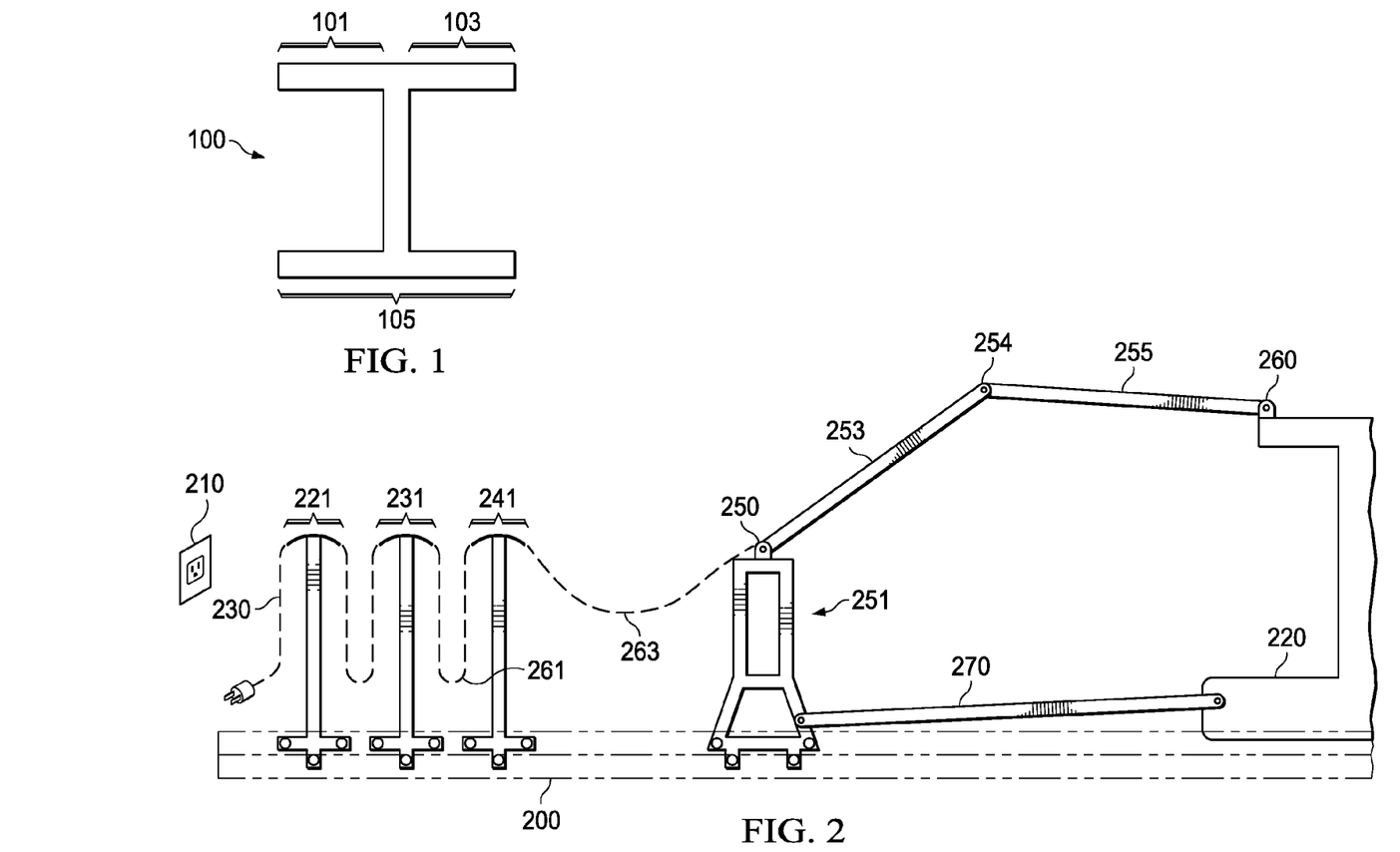
FIG. 1 is a block diagram of a cross-section to an I-beam that may be used as a rail utilized by one or more illustrative embodiments of the invention.
FIG. 2 is a elevation view of plural carts used to elevate a conduit in accordance with an embodiment of the invention.

FIG. 1 is a block diagram of a cross-section to an I-beam that may be used as a rail utilized by one or more illustrative embodiments of the invention. Alternatively, an H-beam may be used in place of the I-beam. Rail 100 can be used to guide cart embodiments along a line that extends generally from a fixed bulkhead where utility and other conduits are available. Rail 100 can reach to and under a drilling rig and, through the cooperation of multiple carts, offer a means to guide one or more conduits to the rig regardless of rig location along the line of current and planned borehole locations. Rail 100 can be placed in parallel with an additional rail if further stability is desired for carts that can ride on such rails.

Rail 100 may rest on terrain, or improved rail-bed using lower surface 105 to bear the weight of the rail and any supporting apparatus. Flange 101 and/or flange 103 can provide a guide for a cart that has horizontally extending protrusions above and below a flange. The protrusions, in some embodiments may be wheels that each rotate about an axle. The placement of wheels or other protrusions below the flange and generally below corresponding protrusions above the flange, can provide stability for a cart and attendant conduit, especially in high wind conditions.

FIG. 2 is a elevation view of plural carts used to elevate a conduit in accordance with an embodiment of the invention. Rail 200 can be placed along terrain from conduit bulkhead 210 to and beyond the current location of rig 220. Positions nearest the bulkhead may be described as rear in relation to longitudinal travel along the rail, while positions farther away from the bulkhead may be described as front, or ahead, with respect to the rail and various cart embodiments, explained further below. Conduit 230 may attach at conduit bulkhead 210 and be draped over plural carts to reach hitched cart 251 that permits the conduit to climb on cable tray 253 and cable tray 255. Cable tray 253 and cable tray 255 may be considered a single cable tray having first end 250 and second end 260, with a joint at or near its center, such as, for example, joint 254. Once the conduit reaches rig 220, it may be semi-permanently attached with comparatively low tension exerted at the rig, as compared to tension placed on the conduit between carts. The tension of conduit at the rig can be less than 100 pounds.

Cart 221, cart 231 and cart 241, generally called festoon carts, may be placed sufficiently close to each other, that conduit drapes down toward rail 200 from atop a conduit-support surface. However, one or more suspensions of conduit can be elevated so that the lowest point of sag is above the heads of workers. Accordingly, relatively unobstructed passage under the conduit may be obtained in such a configuration. A height of the arched conduit-support surface from the rail is the tangential distance from the top of the rail to the most distant part of the arched conduit-support surface, excluding any edges or slots that may provide restrictions to lateral movement. Lateral movement is generally horizontal movement parallel to the rail. The height of the arched conduit-support surface can be, for example, nine feet, which allows for 2.5 feet of sagging between arched conduit-support surfaces of adjacent carts. Sags, of that much or less, generally are above the heads of service personnel that might be operating near the conduits.

Figure 4:
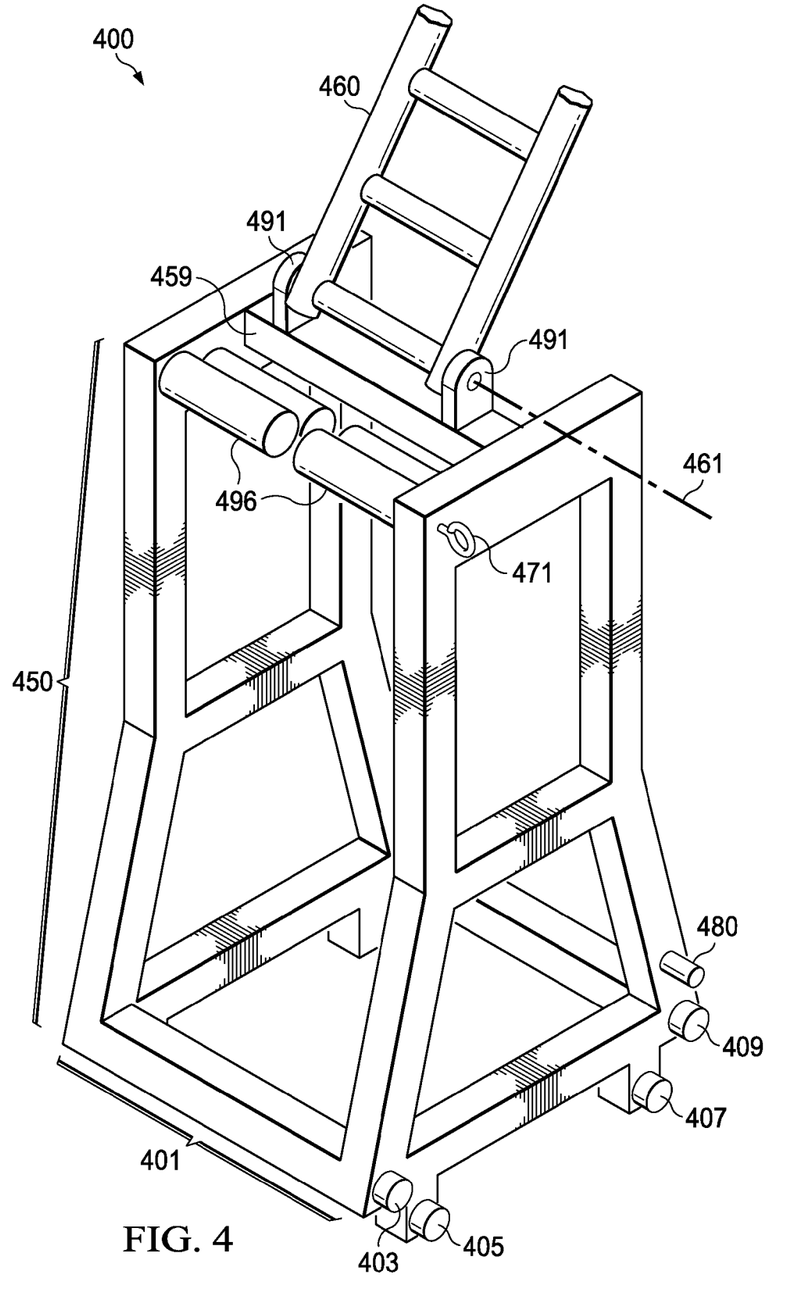
FIG. 4 is a further isometric view of a cart in accordance with another embodiment of the invention.

Hitched cart 251 can be attached to rig 220 via cable trays and via tow-bar 270. Tow-bar 270 may provide a rigid means of transmitting force from a rig that is moving to a new drilling location. As such, tow-bar may attach to hitched cart 251 by a tow-bar attachment point. A tow-bar attachment point is a hitch, axle or other latching mechanism that may extend from a trailer cart, for example, as depicted in FIG. 4, below. It is appreciated that some rigs may have means to provide strain relief to conduits that do not rely on a hitched cart. Accordingly, in some embodiments, conduit may be flexibly attached using one or more carts such as carts 221, 231 and 241.

FIG. 2 shows conduit draped over plural festoon carts where the conduit is supported by arched conduit-support surfaces. An arched conduit-support surface is a part of a cart that provides weight bearing support for one or more conduits. The conduit-support surface may also provide lateral friction or other securing means to prevent wind or other forces from knocking the conduit from atop the arched conduit-support surfaces. It is appreciated, that hitched cart 351 is just one alternative form of interface between the system of festoon carts 221, 231 and 241 and the rig 220, and that an alternative platform cart, depicted at FIG. 5A, et seq., can provide additional or alternative benefits, as will be explained shortly.

Figure 3:
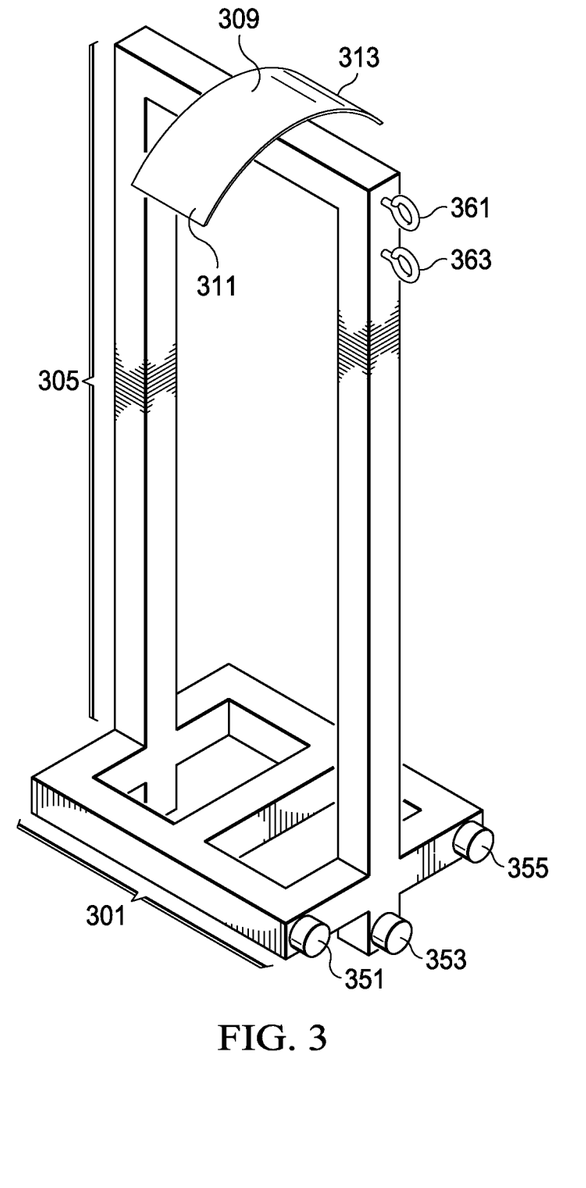
FIG. 3 is an isometric view of a cart in accordance with an embodiment of the invention.

FIG. 3 is an isometric view of a festoon cart in accordance with an embodiment of the invention. A festoon cart 300 is a device that is oriented in a generally upright direction when placed on one or more parallel rails. Festoon cart 300 can include base 301. A base is a generally horizontal assembly that provides a rigid platform for vertical support 305. A vertical support may extend vertically above a base to provide vertical and lateral support to conduits that may be placed atop the vertical support, for example, on arched conduit-support surface 309. Arched conduit-support surface 309 may allow conduit to drape from lip 311 and from lip 313 in positions that can be a vertical segment 261 or as a tensioned horizontal segment 263, as shown in FIG. 2, above. Accordingly, two festoon carts placed next to each other, or even touching, can provide room for conduit to slip between the lips of the respective conduit-support surfaces, to provide a hanging loop of conduit that compresses the net length of the cable from rear to front of the assembly of festoon carts and cable. A lip is the lowest hanging part of the arched conduit-support surface. The lip may provide strain relief for a cable as it hangs in a low tension state. The low tension state is that state when plural carts are positioned relatively near to each other, such as, for example, when the cable is stowed for shipment. The lips may, accordingly, have tangents that are vertical, which may match the direction of a loose cable and/or conduit as it hangs from a lip. Arched conduit-support surface 309 may alternatively be made as wide as the distance between each vertical support 305. In some cases, the arched conduit-support surface 309 may be made even wider, so long as the positioning of the cart when stowed for transport or staged at a job site, permits free travel along rails with sufficient clearance from any overarching superstructure, such as, for example, a platform cart, depicted, for example, at FIGS. 5A and 5B, below.

Base 301 may be supported by at least protrusions that extend outward from the base and perpendicular to a rail. FIG. 3 shows first right-side super-rail protrusion 351 and second right-side super rail protrusion 355. These protrusions may be placed atop a rail flange. Below the rail, the base may extend a right-side sub-rail protrusion 353. The various protrusions may be implemented as wheels, to make moving each cart easier along the rail. The flange may thus be sandwiched between opposing wheels so that the right side of the cart neither collapses into the terrain nor is tipped upwards by operation of wind or other lateral forces.

On the left side of the cart, similar protrusions may extend. These left-side protrusions are not shown in FIG. 3. These protrusions may be in corresponding, but opposing, orientations to first right-side super-rail protrusion, second right-side super-rail protrusion and right-side sub-rail protrusion. Accordingly, a first left-side super-rail protrusion, second left-side super-rail protrusion and left-side sub-rail protrusion may engage with a second rail that generally parallels rail 200 of FIG. 2.

Each protrusion may be cylindrical or bear a wheel on an axle. Alternatively, one or more protrusions may lack a wheel or even be flat on a side facing the flange. In either case, the protrusions may slidably engage a rail flange, and in particular, permit longitudinal movement of carts along the one or more rails that lead to the rig. Among the super-rail protrusions, each embodiment can have at least one such super-rail protrusion on a side, while the additional second super-rail protrusion is an optional feature. In situations where a protrusion includes a wheel, these wheels may be called left-side wheels or right-side wheels. A wheel is super-rail, if it is oriented to be placed above the rail. A wheel is sub-rail if it oriented to be placed below the rail. Accordingly, through the operation of the protrusions in engagement with a rail flange, the base of festoon cart 300 may be secured to prevent tipping, either in the front-to-rear direction, or in the perpendicular direction lateral to the rails.

A cart width is a distance between an outermost right-side sub-rail protrusion and an outermost left-side sub-rail protrusion that are coaxial, one to the other. A cart width can be one fifth or less as compared to a vertical support height. A vertical support height is a distance from sub-rail protrusion to a top of an arched conduit-support surface. A maximum clearance distance from the track-level is a distance that a conduit lies from a rail when the conduit is on the top of an arched conduit-support surface. A track level, is the uppermost point on a track upon which a cart rides. The cart width, at least for festoon carts that may cooperate with an overarching platform cart, may be such that the width of the festoon cart, together with the supporting rails, permits the supporting rails to be placed within, or nested with respect to, a wider gauge of rails or outer rails. The outer rails can permit overlapping travel of the festoon cart with respect to a platform cart, as explained further, for example, at FIG. 5B.

A conduit may be an electrical cable. An electrical cable is a cable that carries electricity along a conductor and has at least one insulator that jackets the conductor. A helical bias is a tendency of a conduit to spiral or curve in a direction that results in a helix pattern in the coil when suspended between points of less than five feet. The helical bias can be that the conduit coils around an axis with a radius of more than one centimeter. An electrical cable can have a helical bias. Any cable bias that is of a radius greater than 50 cm is incidental to cable storage, and is not considered to be an effective bias in an environment where fewer than 20 meters of cable drape between carts. Nevertheless, some embodiments may include a conduit that can be an electrical cable that is substantially unbiased from being helical.

Plural carts may be tied together with high tensile strength cables to provide mechanical limitations to how far each cart may be moved from a neighboring cart. Conduits, as supported by the carts, have limited tensile strength. Accordingly, it is desirable to distribute the tension placed on segments of conduit so that no single draped segment exceeds a tolerance or otherwise breaks. To provide for limited travel distance between carts, each cart can be provided with tether posts and high tensile strength cables. Tether post 361 and tether post 363 permit a high tensile strength cables to be attached that extend, on one hand, upstream or rearwards to a next cart or other post, and on the other hand, downstream or forward to a next cart or other post. A tether post is an eyelet, post, or other sturdy attachment point that may be suitable to admit a carabineer or other loop at an end to a high tensile strength cable. Additional tether posts may be placed on the hidden side of cart 300. Typically, when deploying a cart system, each segment of conduit is somewhat longer than the high tensile strength cables. A cable is high tensile strength if it can bear more tension without damage than an insulated electricity carrying conduit, or other conduit, placed on the cart system. Accordingly, if one cart is pulled in a manner that brings the nearby high tensile strength cable segment nearly horizontal, the high tensile strength cable pulls the neighboring cart closer in a manner to more evenly distribute the tension among conduit segments. Accordingly, when a rig or other towing force pulls the system of carts into an elongated configuration, the system regulates tension to drag carts, that are in relatively low tension relative to each other, along with the cart closest to the rig. In other words, the operation of high tensile strength cables can contribute to the integrity to the system of carts and conduit, reducing the possibility that any segment of conduit be markedly more extended and prone to breakage.

An umbilical system includes at least two carts. Such carts can be, for example, as shown in FIG. 2 as cart 231 and cart 241. Further, the carts can include trailer cart 251 used to handle a length of cable extending from a last festoon cart, and deliver the cable to a drilling rig. In each case, the umbilical system can include one or more portions of conduit suspended from the carts. A length of conduit suspended between carts is the length of the conduit from arched conduit-support surfaces of adjacent carts or from an arched conduit-support surface to a cable tray support. The length of the conduit suspended between carts can be less than three times a height of the first arched conduit-support surface from the rail.

FIG. 4 is a further isometric view of a cart, such as trailer/hitching cart 251 of FIG. 2 in accordance with another embodiment of the invention. Hitching cart 400 includes base 401. Base 401 can include a first right side sub rail protrusion 405 and a second right side sub-rail protrusion 407. Further extensions from the right side of base 401 can include a first right side super-rail protrusion 403 and a second right-side super-rail protrusion 409. It is appreciated that fewer than two right-side sub-rails may be used or more than two may be used. Each super-rail protrusion or wheel is at a level higher than the a sub-rail protrusion or wheel height The one or more right side sub-rail protrusion and the right side super-rail protrusion are adapted to straddle a substantially horizontal flange, for example, flange 101 of FIG. 1. The base may also have left-side protrusions that project from the left side of the base, not shown in FIG. 4.

Vertical support 450 can extend upwards from the base. Attached to vertical support 450 may be cable tray 460. Cable tray 460 can rotate about axis 461 to accommodate rigs of varying heights. Cable tray can be, for example, cable tray 253 and 255 of FIG. 1. Cable tray 460 attaches to vertical support 450 by cable tray support 459. The cable tray support can be connected to a first end of a cable-tray.

Cable tray dock 491 is provided to permit cable tray 460 to attach to the hitching cart. Cable tray 460 may be secured through an axle extending along axis 461. Optional serpentine routing of cables may be placed through cable posts 496. Such routing can provide friction that prevents a cable from having too much slack as it climbs the cable tray and extends off the hitching cart to a neighboring cart. As such, the hitching cart admits an end of a cable-tray in rotational engagement substantially at a top of the vertical support.

Further tether posts may be provided to hitching cart 400 to provide protection against inadvertent breakage of the cable segments. For example, tether post 471 can provide a tether to the next upstream cart. An additional tether post is hidden on the hidden side of hitching cart 400.

Hitching cart 400 may have tow-bar attachment point capable of accepting a tow device for transmitting force substantially along one or more rails. A tow device can be a rigid bar extending from a mobile drilling rig. A tow device can be a chain or other flexible connector that attaches to a mobile drilling rig. Tow-bar attachment point 480 may be a post, hitch or other attaching or latching means extending from vertical support 450. Alternatively, tow-bar attachment point may attach to base 401.

Described above, with respect to, for example, FIG. 2, is a system of cooperating festoon carts and a hitching cart, where the festoon carts deliver conduit from a utility bulkhead to the hitching cart, which is forward-most along a set of rails. Hitching cart 251 provides an interface from the rail-born carts to the drilling rig, by permitting the conduit to extend one more segment, and then to climb up a cable-tray or gantry to reach a level convenient for operations on the rig. As an alternative to the use of the hitching cart in this system, an embodiment provides for use of a platform cart for use with festoon carts, the platform cart providing its distinct uses and services. One distinguishing feature of the platform cart as compared to the hitching cart, is that the platform cart can provide better stowing capability when it rests on a set of rails that are a broader gauge than the rails supporting plural festoon carts. In other words, the platform cart can be supported by rails that nest the narrower gauge rails that support the festoon carts within broader gauge rails, as described further below.

Figure 5A:
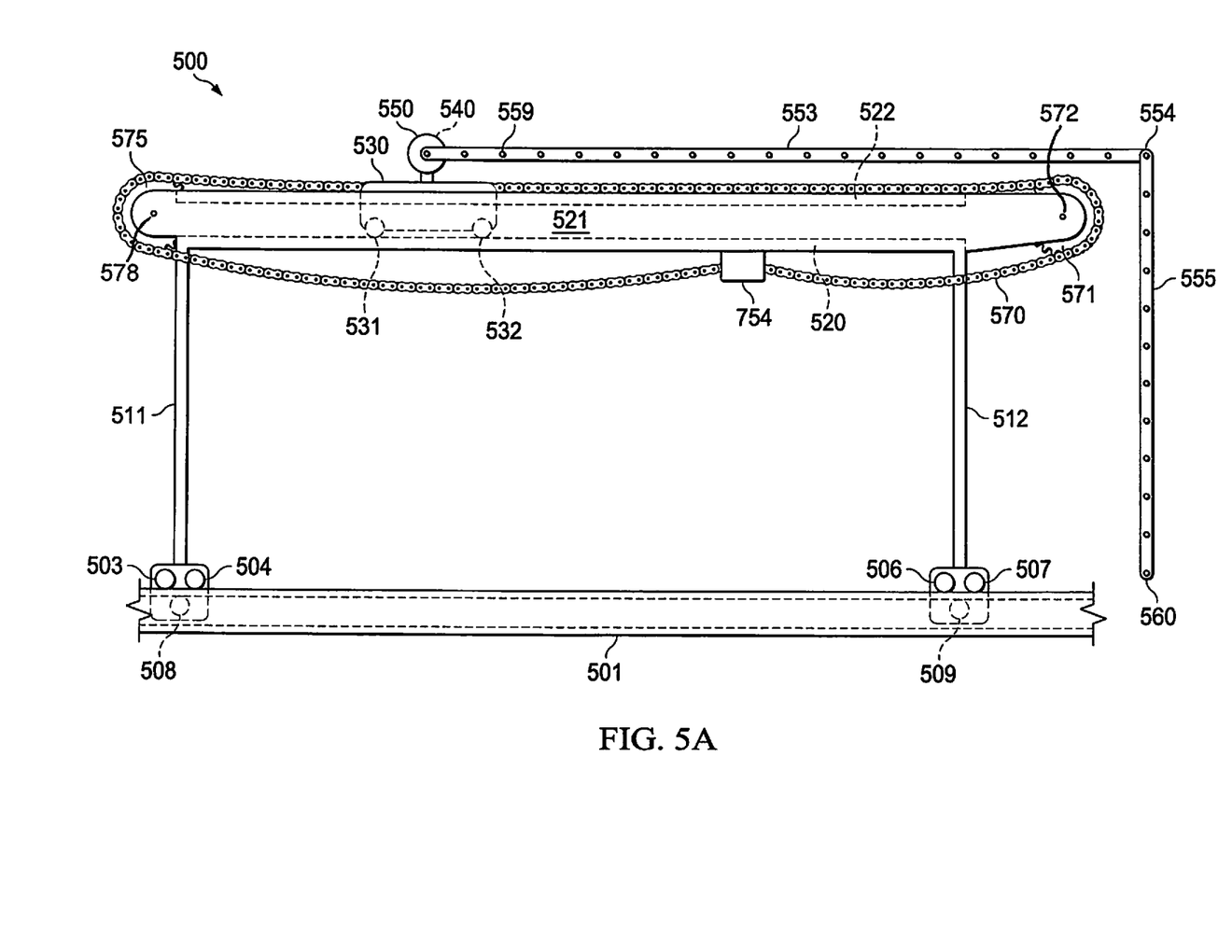
FIG. 5A is a side view of a folded, retracted, and/or stowed platform cart in accordance with an embodiment of the invention.

FIG. 5A is a side view of a folded, retracted, and/or stowed platform cart in accordance with an embodiment of the invention. For ease of viewing, FIG. 5A omits the conduit, but it can be appreciated that conduit arrives from the rear, or left in FIG. 5A, and suspends underneath the platform/trough, to wrap around a most forward (or rightwards in FIG. 5A) lip of the platform and continue for a short portion, to the left or rearward before climbing upwards on a cable-tray or gantry. The platform cart can be in an extended configuration with the conduit. Platform cart 500 is supported and anchored using a pair of outer rails, for example right-side rail 501. Right-side rail can be in the form of I-beam 100 of FIG. 1 or other rail providing horizontal flanges. Right-side super-rail protrusions 503 and 504 provide a support for the platform cart, in coordination with right-side super-rail protrusions 506 and 507, as well as left-side super rail protrusions, which may be two pairs of protrusions, not shown, on an opposing side of platform cart 500. Further, for additional stability, right-side sub-rail protrusions 508 and 509 can limit the effects of wind and other tipping forces on the structure of platform cart 500 by being placed below an upper flange of the right-side rail 501. Each protrusion can be, for example, a wheel. Protrusions 503, 504 and 508 may form a wheel cluster.

Extending upwards from each wheel cluster, can be four struts, for example, strut 511 and strut 512. Further struts, on the opposing side, are not shown. The struts support a trough floor 520 which can be planar, and extend generally longitudinally in the direction of the outer rails between the utility bulkhead, normally on the left but not shown, and the rig, which may generally be located to the right.

The trough floor 520 can provide support for both a base to a gantry as well as a conduit conveyor, described further below with respect to FIGS. 7A and 7B. Base 530 is arranged to travel longitudinally along the trough floor 520. Base 530 may ride on wheels, for example, right wheels 531, 532. To provide further guidance to right wheels, trough wall 521, and trough lip 522 may block stray lateral movements and upwards movements, respectively, of the wheels. Similar, corresponding, trough wall and a trough lip may cooperatively engage left side wheels, not shown. Such a corresponding trough wall lip may be a mirror image to trough wall 521 and trough lip 522 shown in FIG. 5A. The cooperation of trough floor 520, trough wall 521 and trough lip 522 may be described as a groove or track.

Base 530 may support hinge 550, which can turn about at least two axes, including a vertical axis vertically disposed along vertical axel 540 which may be seen also in FIG. 5B, below. Support hinge 550 provides a further axel which may support cable tray 553 to additionally provide hinging about angles to the horizon. Vertical axel 540 and hinge 550 may cooperate together to form a universal joint. Cable tray 553 attaches by joint 554 to a further cable tray 555. Cable tray 555 terminates in a hitching point 560. Through the operation of vertical axel 540, hinge 550, joint 554, many degrees of freedom are provided to the plural cable tray structure to permit hitching to a rig on either side of the tracks or a rig placed along and over the tracks, while carrying conduits along the cable trays, and optionally on or indirectly upon the trough floor. Cable tray 553 has cross-members or rungs, that provide support to conduits placed thereon. In operation, and attaching hitching point 560 in an elevated position to a rig, a conduit climbs to the rig via a first or lowermost rung 559 to cable tray 553. Flange 754 is provided beneath trough floor 520 to elevate a chain which generally encircles the trough floor, as explained further, below, with reference to FIGS. 7A and 7B, below.

The platform cart can be in a position where it is a) attached, via hitching point 560 to a drilling rig; and b) positioned to a point on outer track, remote from the conduit bulkhead. The conduit bulkhead can be a point where a utility company's equipment ends, and provides a suitable connection to a customer's equipment. Accordingly, base 530 can be near a forward end of trough floor 520 nearest to the forward end of the trough. A conduit conveyor, is described in detail at FIG. 6 and FIGS. 7A and 7B, below. Conduit conveyor is may be a pair of chain segments, each arranged in a manner similar to a bicycle chain, except that each chain is of equal length, and major links have a rigid cross-member that extends from a link of one chain, transverse, to attach to the corresponding link of the second, parallel chain. The width of the pair of chains and cross-member is thinner than a space between trough walls. The conduit conveyor has two ends. A first end can be fastened to base 530. The second end, may be about the length of the trough. To the extent that it is attached to anything, it may be attached to one or more conduits that are guided through the system. The second end of the conduit conveyor may hang suspended between sprocket 571 and a nearest festoon cart 549 (see for example, FIG. 7B). It is appreciated that the forward end of the trough may additionally provide a rounded extension, not shown, to provide a fillet about which the conduit conveyor may drape around as it reverses course around the forward end of the trough and/or sprocket.

Figure 5C:
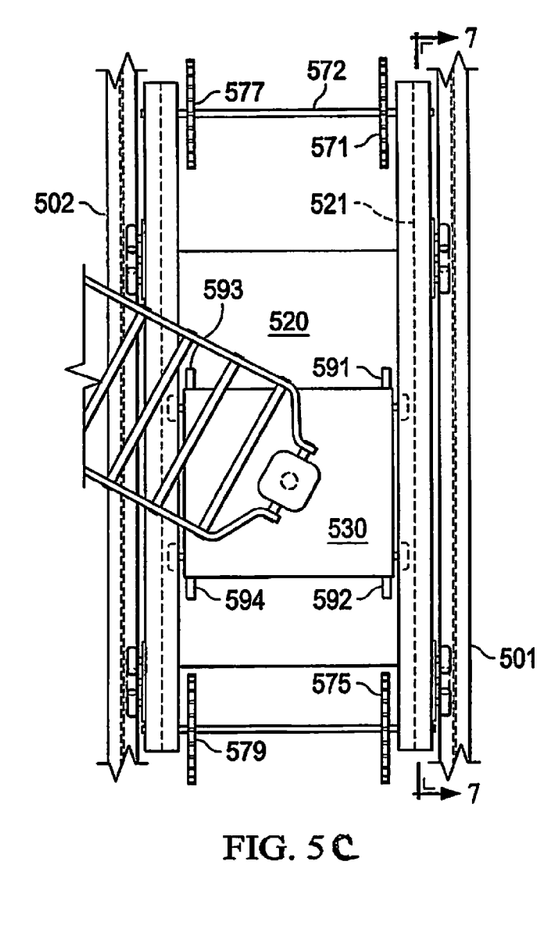
Figure 6:
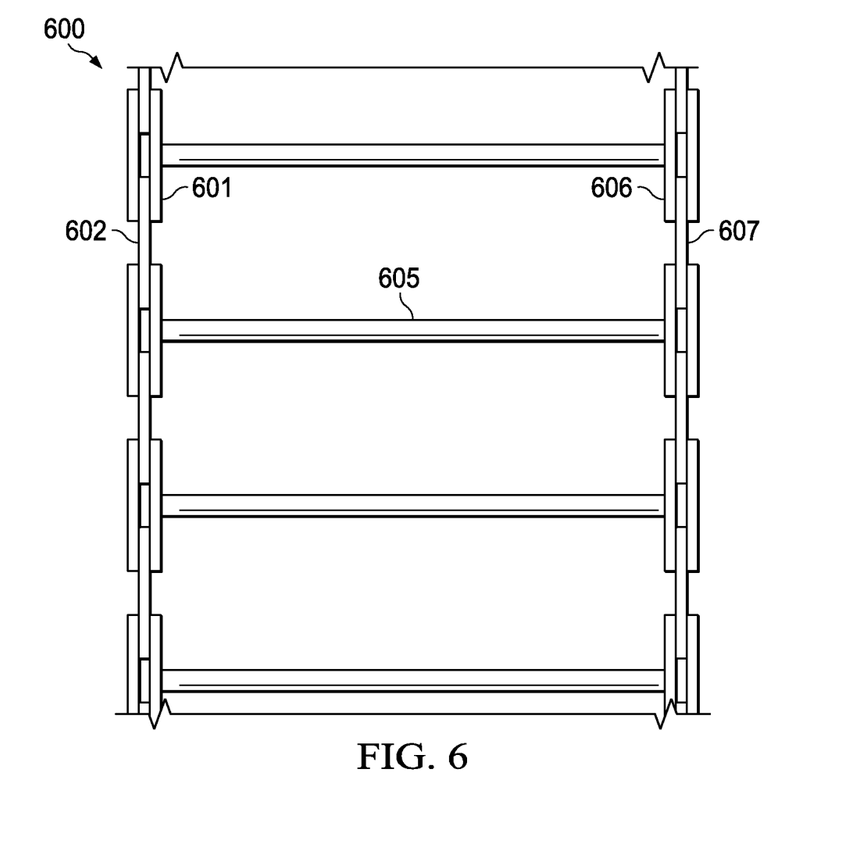
FIG. 6 is a top view showing a detailed view of a cable conveyor, without a cable attached in accordance with an embodiment of the invention.

With reference to FIG. 6, conduit conveyor 600 can provide added stability and rigidity to plural cables given two additional features and or methods of using of conduit conveyor 560. First, the manufacturer or operator of the platform cart, may tie each conduit to plural cross-members of the conduit conveyor using cable ties or other cable securing means, such as, for example, Kindorf® fast cable links. Kindorf is a Trademark of Asea Brown Boveri Ltd. As such, each conduit is resistant to kinking or buckling when pushed or pulled along trough 520. Returning to FIG. 5A, second, the conduit conveyor may, when on top of trough 520 ride on a chains that attach, at each end, to opposing ends of base 530, and further wrap around co-planar spindles, one located at each end of the trough. For example chain 570 wraps to sprocket 571, which is disposed on spindle 572, the spindle extending through a hole in a wheel protrusion extending from the platform. Chain 570 extends under the trough, to hang based on tension, upon support-flange 754, and again, based on tension, to wrap around sprocket 575. From there, chain 570 can attach to base 530, completing a circuit, where the base, can be a link, albeit a large one, to connect each end of the chain 570. A parallel chain wraps around sprockets 577 and 579 (as seen at FIG. 5C) which are mounted in parallel to sprockets 571 and 575, respectively, via spindles 572, and 578, respectively. Spindle 578 extends through a pair of protrusions that also extend from trough walls at the near end of platform, on the opposite side of FIG. 5A. Chains, for example, chain 570, are spaced in parallel to have a width to the outermost links thinner than the trough. Accordingly, movement of base 530 can both push and pull the conduit conveyor for those portions of the conduit conveyor that rest on top of the parallel chains. Flange 754 prevents excessive sag of the chain 570, while a corresponding flange, on the opposite side, similarly supports the other parallel chain. Accordingly, festoon carts that nest within platform cart 500 may have clearance to move below the chain 570, and along their respective tracks or rails without touching parallel chains such as, for example, chain 570.

Figure 5B:
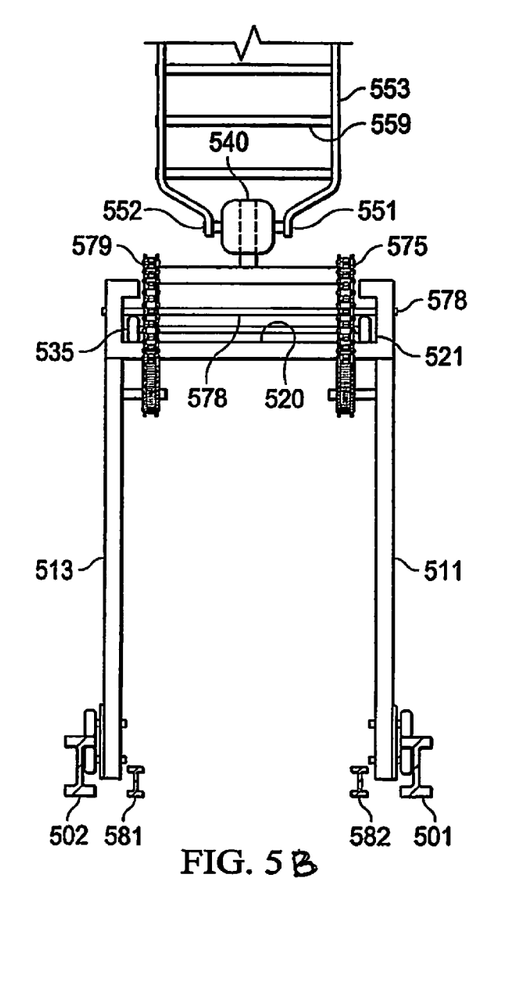

FIG. 5B is an elevation view, looking longitudinally at the platform cart in accordance with an embodiment of the invention. Features such as vertical axel 540 can be seen providing a pivot point about which cable tray 553 can rotate to the left or right of the outer track composed of rails 501, 502. FIG. 5B shows the platform cart looking from the utility bulkhead towards the rig, or from the left-hand side of FIG. 5A. Spindle 578 appears in the foreground, and may extend through sprockets 575, 579 to penetrate parallel protrusions through generally cylindrical holes. Spindle may either be fixed with respect to sprockets, and rotate freely in the cylindrical holes, or the sprockets may rotate freely on the spindle. A hinge is formed by opposing pins 551, 552 that support cable tray 553 with sufficient clearance to lay conduits on top of base 530 and turn the conduits upwards to rest on or near lowermost rung 559.

A festoon cart as depicted at FIG. 3 may nest underneath a platform cart, for example, platform cart 500, by being placed on inner rails 581, 582 which are a narrower gauge than outer rails which support the platform cart. Further, conduit-support surface 309 may have a width narrow enough to pass between strut 511 and strut 513.

FIG. 5B additionally shows wheel 531 and wheel 535 placed within tracks. Wheel 531 is entrapped on trough floor 520, trough wall 521, and trough lip 522.

FIG. 5C is a top view of the platform cart, showing the cable tray 553 swiveled at an angle to the longitudinal path of the tracks in accordance with an embodiment of the invention. Omitted from FIG. 5C are parallel chains as well as the conduit conveyor in order to provide a better view of the other parts. However, it is understood that the chains and conduit conveyor may be used in many embodiments. Chain 570, shown in reference to FIG. 5A, can attach to chain couples 591, 592 on base 530 and further wrap around sprocket 571 and sprocket 575 to provide some uniform support to conduit conveyor, for example as when the base moves. In other words, the chain 570, as shown in FIG. 5A, connects to base 530 via couple 591 at a forward end of the base, and at couple 592 at a rearward end of base 530. As such, base 530 becomes, in some respects, a very large link in a circular chain. A parallel chain can attach to couples 593, 594 on base 530 and further wrap around sprockets on sprockets 577, 579 to provide further uniform support to a conduit conveyor.

Trough floor 520, provides can provide support to a conduit conveyor. Chain 570, not shown, and any parallel chain can carry the conduit conveyor over trough floor 520 and over sprockets 571, 577. The conduit conveyor, as explained in FIG. 6, below, can provide resistance to lateral shear forces on plural conduit that may be strapped or otherwise fastened to the conduit conveyor. By placing the conduit conveyor on at chain 570 and its parallel chain, force applied at the base, forward and rearward along the tracks its wheels move within, can further diminish any shear forces on the plural conduit. Thus, the force of the base being moved forward and rearward along the tracks of the base, is further passed along the two chains, for example chain 570 in FIG. 5A, as well as to any conduit conveyer placed thereon.

FIG. 6 is a top view showing a detailed view of a conduit conveyor in accordance with an embodiment of the invention. FIG. 6 does not show the attendant conduits, so that the conduit conveyer may be seen more clearly. Conduits secured to conduit conveyor 600 may be slid, longitudinally, with minimal weaving or kinking, for example, when the conduit conveyor is supported on a chain such as parallel chains, such as chain 570, depicted among FIGS. 5A-5C. Conduit conveyer may use chains that have a similar construction as a bicycle chain, that is, having major links and minor links with transverse pins providing a single axis of rotation between each corresponding major link and minor link. Major link 601 may provide a tangential cross-member 605 that connects to major link 606. Major link 601 may connect to minor link 602 through a pin which may extend through members of each of the major link and minor link, thereby providing flexibility from major link to minor link. Similarly, major link 606 may attach through a pin to minor link 607. Each of major links 601, 606 and minor links 602, 607 may repeat for as long as the conduit conveyer is desired to be. Cross-members can bridge every major link, or every other major link. Alternatively, the cross-members may be attached to skip a desired number of major links, to provide any desired shear strength and support to conduit conveyor 600. Accordingly, conduits may be attached to cross-members using cable ties or other suitable connecters, as described above. Conduit conveyor, may attach directly to the base, by interlinking at least one final major link of the conduit conveyor to a loop extending from the conduit conveyor, for example, using a transverse pin. Such a loop extending from the conduit conveyor may be near couple 591 depicted in FIG. 5C.

Figure 7A:
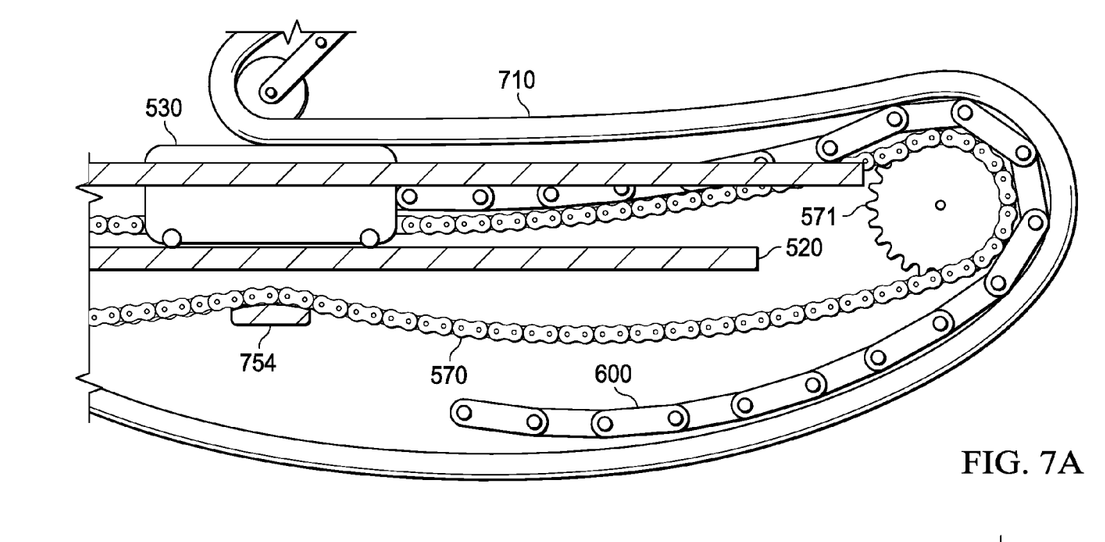
FIGS. 7A and 7B is a side view of the cable trough with the cable conveyor in accordance with an embodiment of the invention.
Figure 7B:
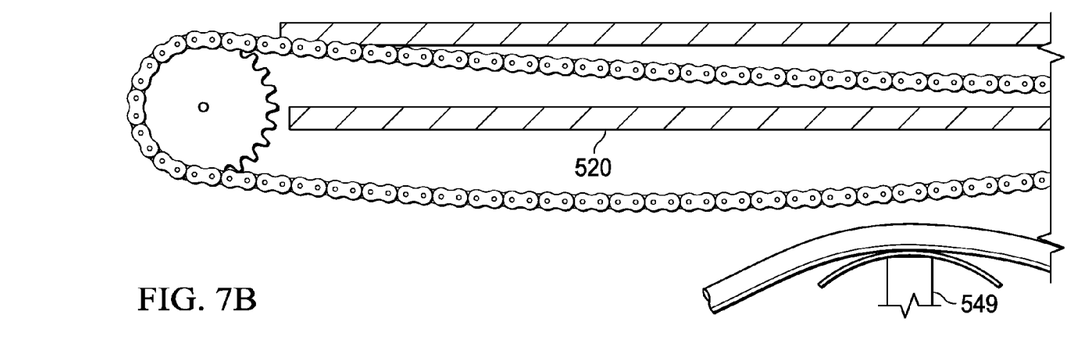

FIGS. 7A and 7B is a sectional and detailed side view of the cable trough with the cable conveyor in accordance with an embodiment of the invention. FIGS. 7A and 7B expands the view of the forward end of the cable trough, and cutting away further detail rear of the middle of base 530. Cable conveyor 600 connects to base 530 at connector 597. Cable conveyor 600 may rest upon chain 570, which can, depending on the position of the base, rest on trough floor 520. Chain 570 engages in sprocket 571 and routes, thereafter, underneath trough floor 520. Conduit conveyor 600, on the other hand, may loosely engage to chain 570 and corresponding parallel chain, (not shown) until it reaches sprocket 571. Beyond the sprocket 571, conduit conveyor 600 may separate from chain 570 and droop, in tension, with a segment of conduits that rests on the first festoon cart, for example, festoon cart 300 of FIG. 3. In some respects, the portion of conduit conveyor 600 that extends below the platform is supported by the conduits themselves. For clarity, conduit 710 is shown without cable ties or other connectors tying conduit 710 to cross-members of conduit conveyor. Recall, from FIG. 6, above, that major link 606 (not specifically shown in FIGS. 7A and 7B) can have a cross-member that links major link 606 to a parallel major link. Conduit 710 may be attached to such cross-members, and thus, to the overall structure of conduit conveyor 600, to, on one hand, be supported by the conduit conveyor, while on top of the trough floor 520, and on the other hand, not be supported at places where the conduit conveyor extends below the trough floor. It is appreciated that the use of plural cable ties and/or other connectors to strap the one or more conduits to the cable conveyor can provide integrity to the individual conduits to maintain relatively direct travel from rear to forward of the cable trough, without any substantial kinking in the conduit.

As may be appreciated, alternative ways to support the festoon carts may be available, such as, for example, by placing the flange upon which the festoon cart is supported at a level below a flange of the platform cart.

Accordingly, one or more embodiments may permit the support of conduits above a rail in a manner that may permit draped cables to be pulled taught in individual segments that can clear the heads of workers that operate a drilling rig. As such, the slack conduit so-draped, can be extended to permit zones of relatively unobstructed passage without the need to disconnect or reconnect the conduits in response to moving the drilling rig along a line of linearly placed boreholes.

Embodiments presented herein are illustrative and show examples of how features and limitations may be combined. Still further embodiments are within the spirit and scope of the invention described by the following claims.

What is claimed is:

1. A gantry comprising:
   an elongated carriage having at least four struts extending downward, each strut terminating in at least one lateral protrusion for engaging to a rail for travel in a longitudinal direction;
   a pair of tracks mounted, in the longitudinal direction, along a top of the elongated carriage, the tracks arranged to support and permit longitudinal travel to a base;
   the base, having at least a first pair of lateral protrusions to engage the pair of tracks and a second pair of lateral protrusions to engage the pair of tracks, the base supporting a cable tray, the cable tray capable of being elevated from a hinge, the hinge proximal, and attached to the base.

2. The gantry of claim 1, further comprising: for each of the at least one lateral protrusions, an opposing lateral protrusion placed to sandwich, therebetween, a longitudinal flange-style rail.

3. The gantry of claim 1, wherein the cable tray comprises a vertical axel, proximal to the base, about which, the cable tray may rotate.

4. The gantry of claim 1, wherein the at least one lateral protrusion is a wheel and the at least a first pair of lateral protrusions is an at least one pair of wheels and the second pair of lateral protrusions is at least one pair of wheels.

5. A gantry comprising:
   a base;
   the base, having at least a first pair of wheels each placed on respective axels attached to the base, each wheel extending, in part, below the base, to engage the pair of tracks and a second pair of wheels each placed on respective axels attached to the base, each wheel extending, in part, below the base, wherein the first pair of wheels engages a first track, and the second pair of wheels engages a second track, the base supporting a universal joint, extending from a top of the base;
   the universal joint further supporting from two horizontally disposed pins, a cable tray, wherein the cable tray is comprised of a pair of side rails, that extend generally parallel to each other, and have lateral rungs attached at a tangent to each rail, wherein the side rails taper inwards at an end of the cable tray, and wherein the end of the cable tray provides a through-hole transverse to the side rails in each side rail, the through-hole admitting a pin, for each through-hole, the pin forming a component of the universal joint.

6. The gantry of claim 5, wherein the first track and second track have a common floor in a trough floor, the gantry further comprising:
   a conduit conveyor, the conduit conveyor having:
      at least one chain connected at a forward end of the base and a rear end of the base, the at least one chain encircling the trough floor and configured to substantially move in tandem with the base; and
      the conduit conveyor connected to a forward end of the base, and carried, in part, on the at least one chain.

7. The gantry of claim 6, wherein the conduit conveyor further comprises, a portion of at least two conduits attached each to at least two transverse rungs of the conduit conveyor.

8. The gantry of claim 7, wherein the trough floor has a forward end, and the forward end extends beyond the at least one chain to provide a fillet to the conduit conveyor to guide the conduit conveyor underneath the trough floor.

9. An umbilical system comprising:
   at least one festoon cart placed upon a narrow first gauge track, the festoon cart further comprising:
      at least two first super-rail protrusions configured to rest on top of a flange of the narrow first gauge track, the at least two first super-rail protrusions supporting a vertical support, together with at least two second super-rail protrusions supporting the vertical support;
      a conduit-carrier having drooping ends, the conduit-carrier mounted on top of the vertical support;
   a conduit extending across the conduit-carrier, the conduit further extending to a trough floor of a gantry, the gantry comprising:
      an elongated carriage having at least four struts extending downward, each strut terminating in at least one wheel for engaging to a rail for travel in a longitudinal direction;
      each strut supporting the trough floor above the wheels;
      a pair of tracks mounted, in the longitudinal direction, along a top of the elongated carriage, each track formed, in part, by the trough floor, the tracks arranged to support and permit longitudinal travel to a base;
      the base, having at least a first pair of wheels to engage the pair of tracks and a second pair of wheels to engage the pair of tracks, wherein the base supports a cable tray, the cable tray capable of being elevated from a hinge, the hinge proximal, and attached to the base, wherein the gantry, by operation of the at least one wheel of each of the four struts, is guided by a broad second gauge track, wherein the narrow first gauge track nests within the broad second gauge track and the narrow first gauge track is parallel the broad second gauge track.

10. The umbilical system of claim 9, wherein the at least four struts comprise two right-side struts and two left-side struts, each of the two right-side struts corresponding to a nearest of the two left-side struts, wherein each right strut and corresponding left strut provides a gap sufficient to admit the at least one festoon cart between while the festoon cart is upright on the narrow first gauge track.

11. The umbilical system of claim 10, wherein the conduit, as placed on the conduit carrier, is substantially vertically below another segment of the conduit, that itself is supported by the trough floor.

* * * * *